(12) United States Patent
Seiller et al.

(10) Patent No.: US 10,046,671 B2
(45) Date of Patent: Aug. 14, 2018

(54) OCCUPANT-RECOGNITION SYSTEM FOR VEHICLE SEAT

(71) Applicant: Faurecia Automotive Seating, LLC, Auburn Hills, MI (US)

(72) Inventors: Julien Seiller, Munich (DE); Robert C Fitzpatrick, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 36 days.

(21) Appl. No.: 15/235,882

(22) Filed: Aug. 12, 2016

(65) Prior Publication Data

US 2017/0043681 A1 Feb. 16, 2017

Related U.S. Application Data

(60) Provisional application No. 62/205,263, filed on Aug. 14, 2015.

(51) Int. Cl.
*B60N 2/02* (2006.01)
*B60N 2/00* (2006.01)
*B60N 2/44* (2006.01)
*B60N 2/90* (2018.01)

(52) U.S. Cl.
CPC ........... *B60N 2/0244* (2013.01); *B60N 2/002* (2013.01); *B60N 2/0252* (2013.01); *B60N 2/4415* (2013.01); *B60N 2/914* (2018.02); *B60N 2002/026* (2013.01); *B60N 2002/0268* (2013.01)

(58) Field of Classification Search
CPC .... B60N 2/0244; B60N 2/002; B60N 2/4415; B60N 2/914; B60N 2/0252; B60N 2002/0268; B60N 2002/026
See application file for complete search history.

(56) References Cited

U.S. PATENT DOCUMENTS

| 4,707,027 A * | 11/1987 | Horvath | B60N 2/914 |
| | | | 297/284.6 |
| 5,069,214 A | 12/1991 | Samaras | |
| 6,422,087 B1 * | 7/2002 | Potter | B60N 2/0232 |
| | | | 73/731 |
| 7,206,631 B2 | 4/2007 | Kawachi | |
| 7,239,945 B2 | 7/2007 | Hiemer | |
| 7,322,652 B1 * | 1/2008 | Tache | B60N 2/0224 |
| | | | 297/284.9 |
| 7,774,052 B2 | 8/2010 | Burton | |

(Continued)

FOREIGN PATENT DOCUMENTS

| CN | 1572575 | 2/2005 |
| CN | 0104875744 | 9/2015 |

(Continued)

OTHER PUBLICATIONS

Chinese Office Action for Chinese App. No. 201380064313.2 dated Apr. 12, 2017, 3376 CN II, 21 pages.

(Continued)

*Primary Examiner* — Mussa A Shaawat
(74) *Attorney, Agent, or Firm* — Barnes & Thornburg LLP

(57) ABSTRACT

A vehicle seat includes a seat bottom and a seat back. The seat back is coupled to the seat bottom and arranged to extend in an upward direction away from the seat bottom. The vehicle seat further includes an electronics system.

20 Claims, 6 Drawing Sheets

(56) References Cited

U.S. PATENT DOCUMENTS

| | | | |
|---|---|---|---|
| 8,181,292 B1* | 5/2012 | Pellettiere | B60N 2/42709 |
| | | | 5/654 |
| 8,430,817 B1 | 4/2013 | Al-Ali | |
| 8,616,654 B2 | 12/2013 | Zenk | |
| 9,475,389 B1 | 10/2016 | Fung | |
| 9,717,345 B1* | 8/2017 | Caruso | A47C 31/126 |
| 2005/0248184 A1* | 11/2005 | Piffaretti | B60J 5/04 |
| | | | 296/187.03 |
| 2006/0068693 A1 | 3/2006 | Kono | |
| 2008/0296946 A1* | 12/2008 | Reynolds | B60N 2/4415 |
| | | | 297/284.6 |
| 2009/0030576 A1* | 1/2009 | Periot | B60R 21/01508 |
| | | | 701/45 |
| 2010/0185068 A1 | 7/2010 | Park et al. | |
| 2011/0015468 A1 | 1/2011 | Aarts | |
| 2012/0078123 A1 | 3/2012 | Futatsuyama | |
| 2012/0212353 A1 | 8/2012 | Fung | |
| 2013/0070043 A1 | 3/2013 | Geva | |
| 2014/0039330 A1 | 2/2014 | Seo | |
| 2014/0240132 A1 | 8/2014 | Bychkov | |
| 2014/0276112 A1 | 9/2014 | Fung | |
| 2015/0051526 A1* | 2/2015 | Wang | A47C 7/70 |
| | | | 601/99 |
| 2015/0231991 A1* | 8/2015 | Yetukuri | B60N 2/0284 |
| | | | 297/284.11 |
| 2015/0313475 A1 | 11/2015 | Benson | |
| 2016/0001781 A1 | 1/2016 | Fung | |
| 2016/0029940 A1 | 2/2016 | Iizuka | |
| 2016/0339801 A1* | 11/2016 | Pereny | B60N 2/0244 |
| 2016/0339802 A1* | 11/2016 | Hanlon | B60N 2/0244 |
| 2017/0136922 A1* | 5/2017 | Von Ballmoos | B60N 2/4415 |
| 2017/0158202 A1 | 6/2017 | Yang | |

FOREIGN PATENT DOCUMENTS

| | | |
|---|---|---|
| DE | 102005038289 | 3/2007 |
| DE | 102007053119 | 5/2009 |
| DE | 102009021532 | 11/2010 |
| JP | 2010264092 | 11/2010 |
| KR | 1020010061858 | 7/2001 |
| KR | 1020140027641 | 3/2014 |
| KR | 0101642697 | 8/2016 |
| WO | 2013109154 | 7/2013 |
| WO | 2014147828 | 9/2014 |
| WO | 02014147828 | 9/2014 |
| WO | 2015200224 | 12/2015 |

OTHER PUBLICATIONS

PCT International Search Report and Written Opinion completed by the ISA/US on Apr. 22, 2014 and issued in connection with PCT/US2013/071620.

PCT Search Report and Written Opinion completed by the ISA/EP on May 21, 2015 and issued in connection with PCT/US2015/016803, 13 pages.

Chinese Office Action for Chinese App. No. 201380064313.2 dated Sep. 28, 2017, 3376 CN II, 19 pages.

European Examination Report for European App. No. 15 707 235.6 dated Feb. 6, 2018, 3619 EP II, 7 pages.

Chinese Rejection Decision for Chinese App. No. 201380064313.2 sent on May 17, 2018, 3376 CN II, 13 pages.

* cited by examiner

OCCUPANT-RECOGNITION SYSTEM FOR VEHICLE SEAT

PRIORITY CLAIM

This application claims priority under 35 U.S.C. § 119(e) to U.S. Provisional Application Ser. No. 62/205,263, filed Aug. 14, 2015 which is expressly incorporated by reference herein.

BACKGROUND

The present disclosure relates to a vehicle seat, and particularly to a vehicle seat including a sensor. More particularly, the present disclosure relates to a vehicle seat including one or more sensors coupled to an electronic controller for a vehicle seat.

SUMMARY

A vehicle seat in accordance with the present disclosure includes a seat bottom and a seat back. The seat back is coupled to the seat bottom and arranged to extend in an upward direction away from the seat bottom. In one illustrative embodiment, the vehicle seat further includes an electronics system.

In illustrative embodiments, the vehicle seat includes a plurality of pneumatic bladders, a plurality of pressure sensors, and a seat controller coupled to the plurality of pneumatic bladders and the plurality of pressure sensors. Each of the pressure sensors is coupled to a corresponding pneumatic bladder. The seat controller includes an entry/exit detection module configured to detect user entry into a vehicle, an inflation control module configured to inflate the plurality of pneumatic bladders to a measurement pressure in response to detection of the user entry, and a pressure measurement module configured to measure, in response to inflation of the plurality of pneumatic bladders to the measurement pressure, a pressure value in each of the plurality of pneumatic bladders using the plurality of pressure sensors to generate a pressure map.

In illustrative embodiments, the pressure map comprises a plurality of pressure map elements and each pressure map element includes the pressure value generated by a corresponding pressure sensor. The pressure measurement module is further configured to identify a current user based on the pressure map.

In illustrative embodiments, a seat controller for vehicle seat user recognition includes an entry/exit detection module, an inflation control module, and a pressure measurement module. The entry/exit detection module detects user entry into a vehicle. The inflation control module inflates a plurality of pneumatic bladders of a vehicle seat to a measurement pressure in response to detection of the user entry. The pressure measurement module measures, in response to inflation of the plurality of pneumatic bladders to the measurement pressure, a pressure value in each of the plurality of pneumatic bladders using a plurality of pressure sensors to generate a pressure map. Each of the pressure sensors is coupled to a corresponding pneumatic bladder and the pressure map comprises a plurality of pressure map elements. Each pressure map element includes the pressure value generated by a corresponding pressure sensor. The pressure measurement module is further configured to identify a current user based on the pressure map.

In illustrative embodiments, the seat controller further includes a user preferences module and a seat adjustment module. The user preferences module determines a vehicle seat setting associated with the current user in response to identification of the current user. The seat adjustment module adjusts the vehicle seat based on the vehicle seat setting. The vehicle seat setting may include an inflation setting, a position setting, or a comfort feature setting.

In illustrative embodiments, the seat controller further includes a user behavior module and a seat adjustment module. The user behavior module identifies a user behavior based on the pressure map. The seat adjustment module adjusts the vehicle seat based on the user behavior.

In illustrative embodiments, a method for vehicle seat user recognition includes detecting, by a seat controller, user entry into a vehicle. The method further includes inflating, by the seat controller, a plurality of pneumatic bladders of a vehicle seat to a measurement pressure in response to detecting the user entry. The method then proceeds to measuring, by the seat controller in response to inflating the plurality of pneumatic bladders to the measurement pressure, a pressure value in each of the plurality of pneumatic bladders using a plurality of pressure sensors to generate a pressure map. Each of the pressure sensors is coupled to a corresponding pneumatic bladder and the pressure map comprises a plurality of pressure map elements. Each pressure map element includes the pressure value generated by a corresponding pressure sensor. The method further includes identifying, by the seat controller, a current user based on the pressure map.

In illustrative embodiments, the method further includes determining, by the seat controller, a vehicle seat setting associated with the current user in response to identifying the current user. The method also includes adjusting, by the seat controller, the vehicle seat based on the vehicle seat setting. Adjusting the vehicle seat may include adjusting an inflation setting of the vehicle seat, adjusting a position setting of the vehicle seat, or activating a comfort feature of the vehicle seat.

In illustrative embodiments, the method further includes identifying, by the seat controller, a user behavior based on the pressure map and adjusting, by the seat controller, the vehicle seat based on the user behavior.

In illustrative embodiments, a computing device includes a processor and a memory having stored therein a plurality of instructions that when executed by the processor cause the computing device to perform the method described above.

In illustrative embodiments, one or more machine readable storage media include a plurality of instructions stored thereon that in response to being executed result in a computing device performing the method described above.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
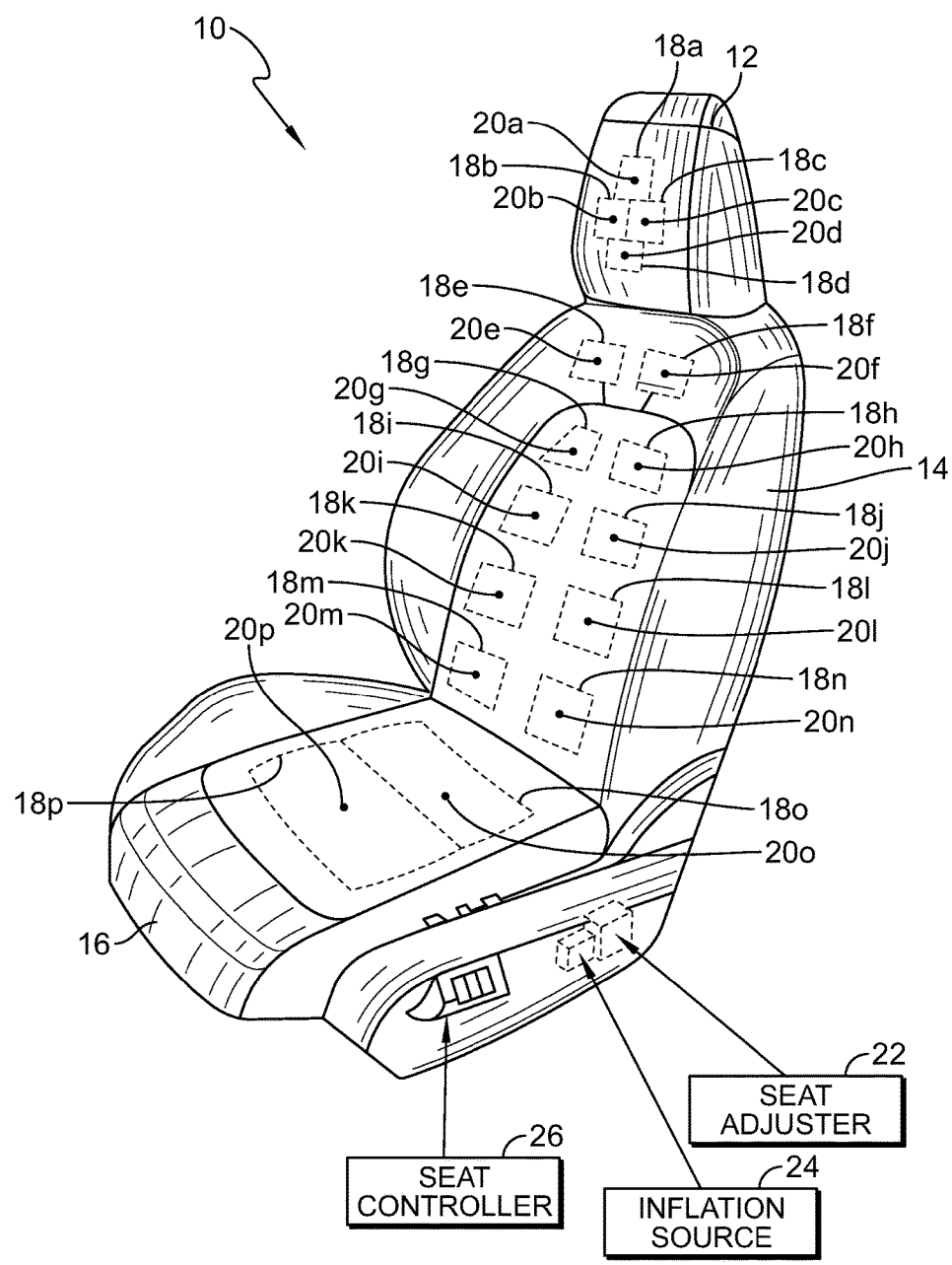
FIG. 1 is a perspective and diagrammatic view of a vehicle seat in accordance with the present disclosure showing that the vehicle seat includes a seat controller and several inflatable pneumatic bladders coupled to pressure sensors included in the vehicle seat.
Figure 2:
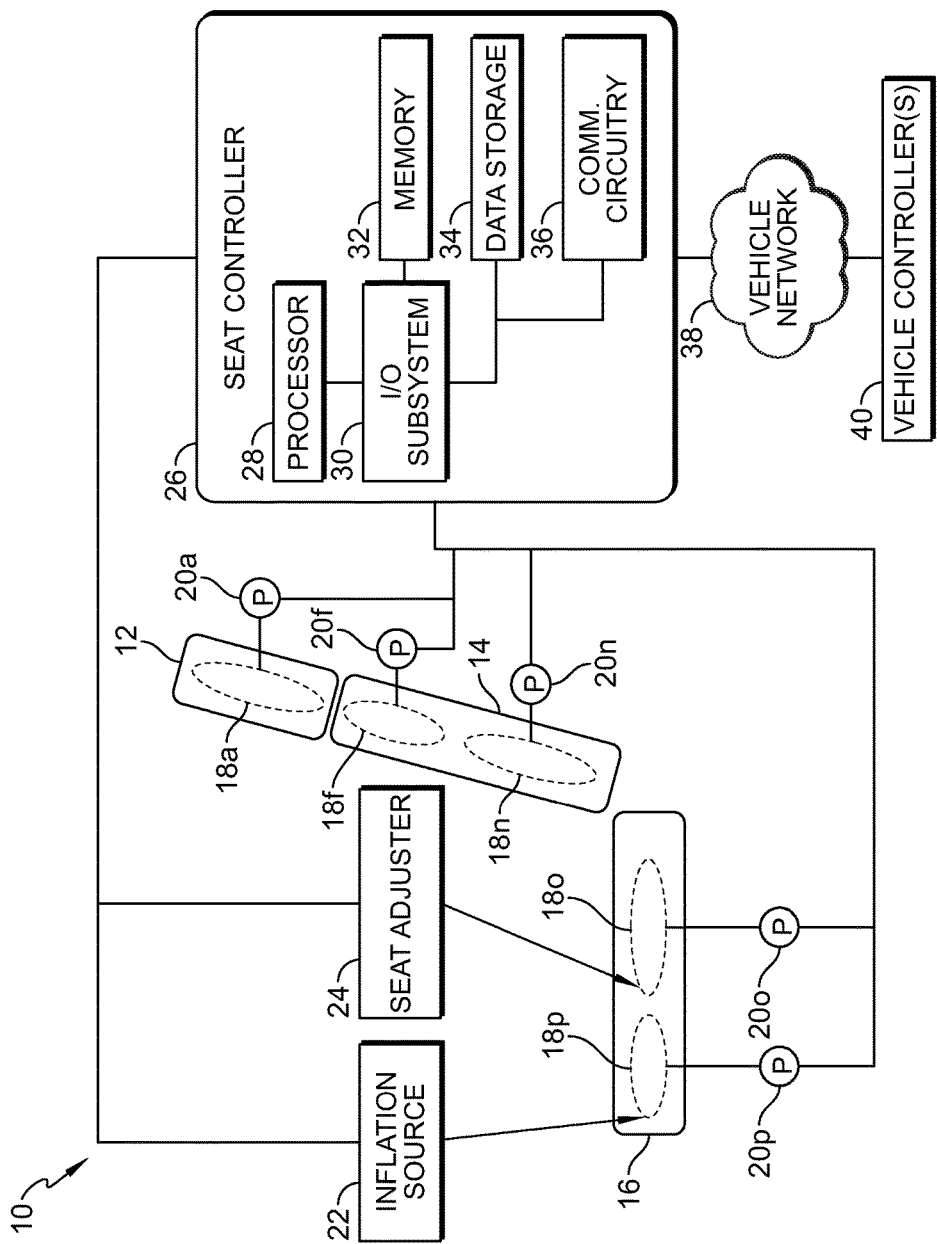
FIG. 2 is a diagrammatic view of the vehicle seat of FIG. 1 showing that the seat controller interfaces with the pressure sensors, an inflation source, and a seat adjuster of the vehicle seat and that the seat controller interfaces with a vehicle network and one or more additional vehicle controllers.
Figure 4:
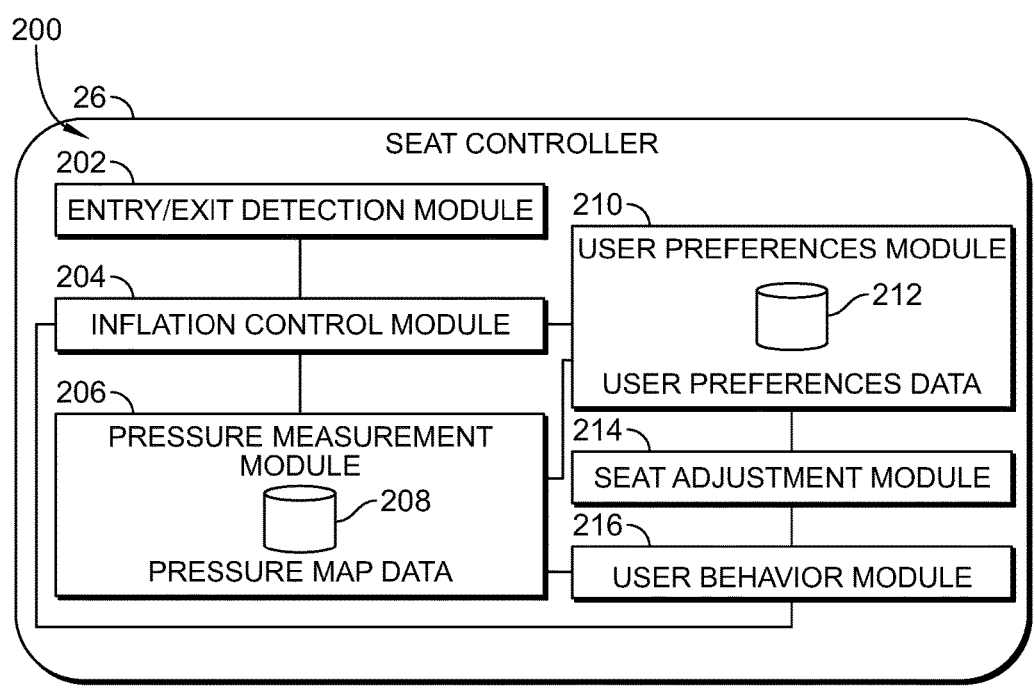
FIG. 4 is a diagrammatic view of at least one embodiment of an environment that may be established by the seat controller of FIGS. 1 and 2.
Figure 5:
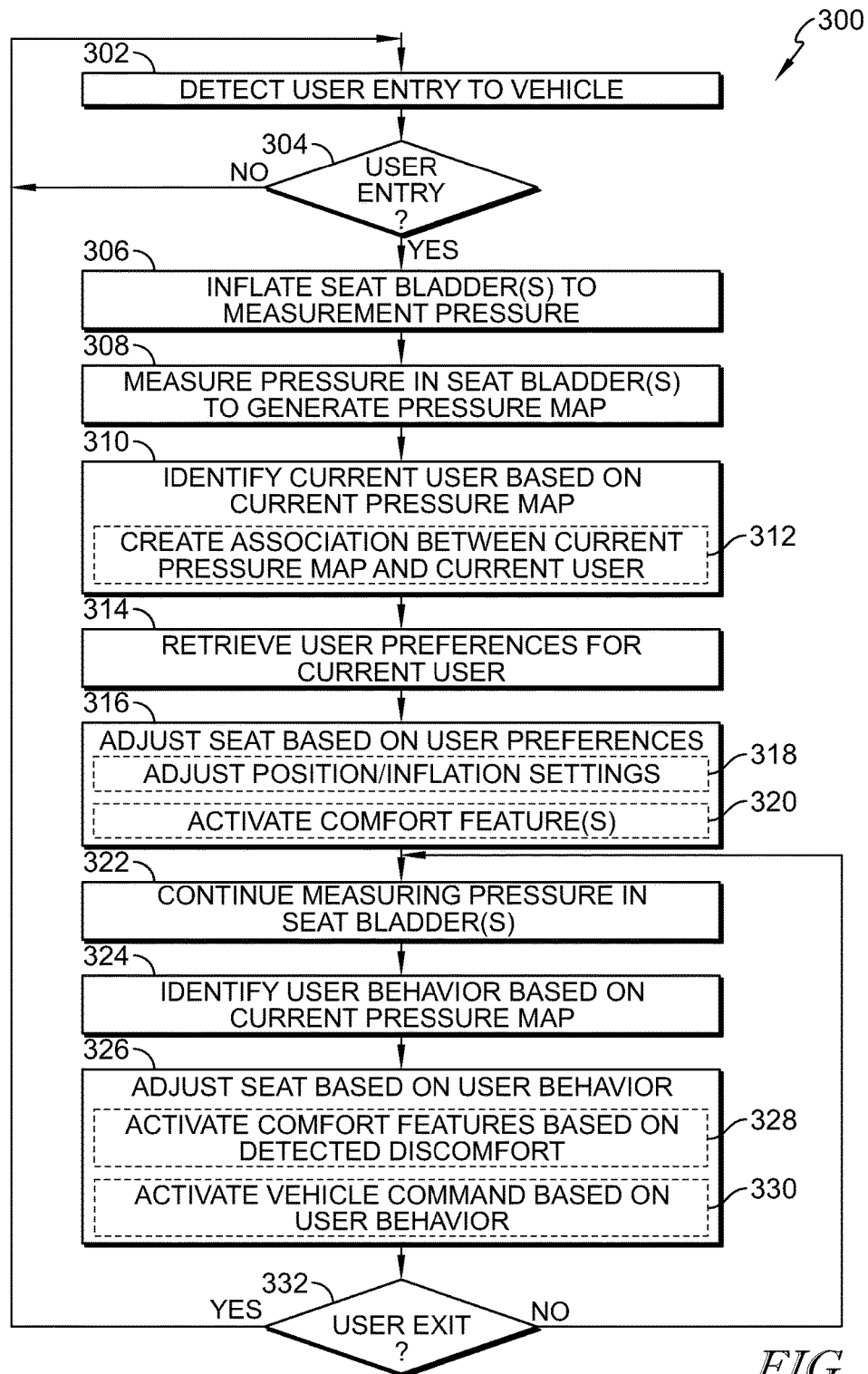
Figure 6:
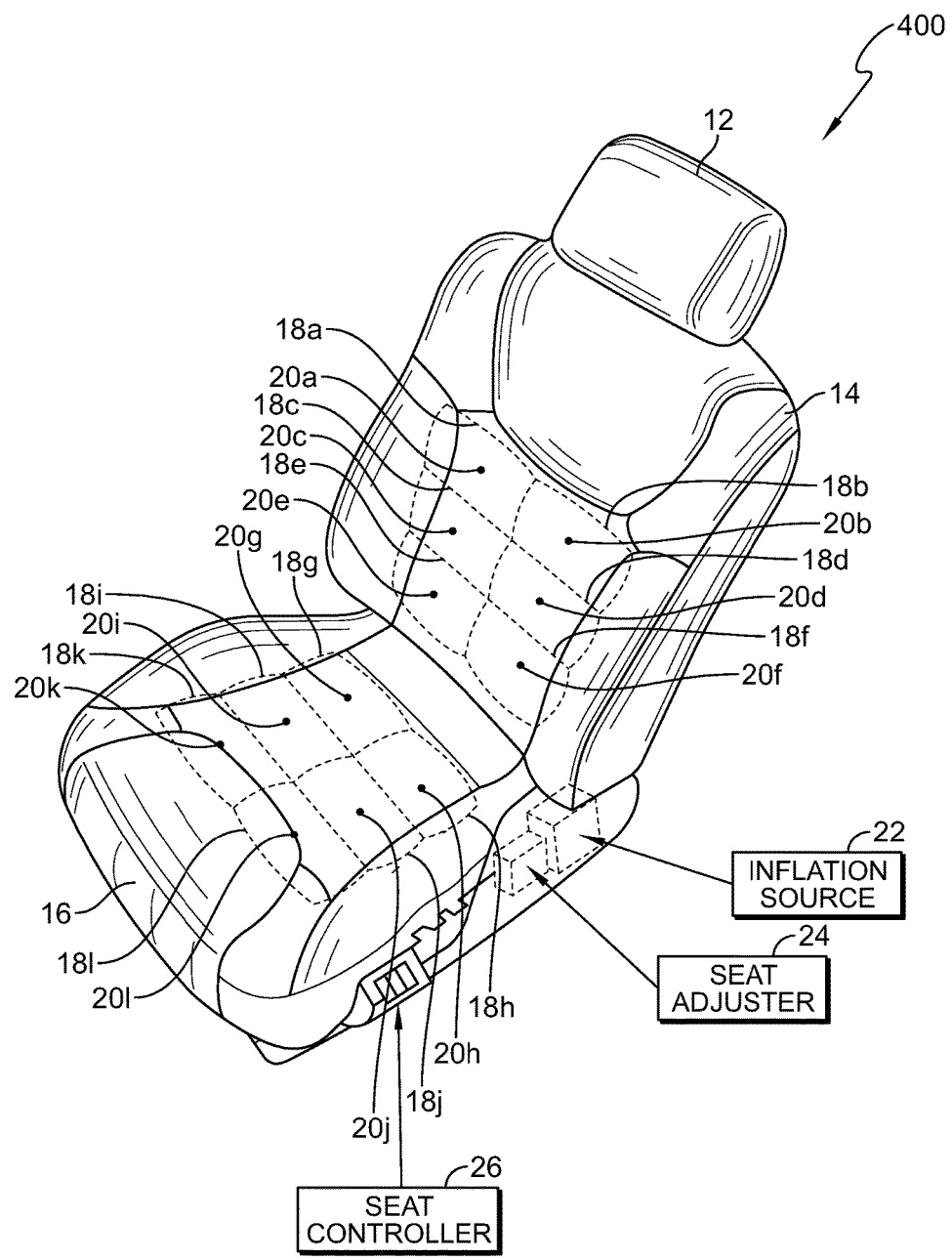

FIG. 5 is a flow diagram illustrating at least one embodiment of a method for user identification and seat adjustment that may be executed by the seat controller of FIGS. 1, 2, and 4; and FIG. 6 is a perspective and diagrammatic view of another embodiment of a vehicle seat in accordance with the present disclosure showing that the vehicle seat includes a seat controller and several inflatable pneumatic bladders coupled to associated pressure sensors.

DETAILED DESCRIPTION

A first embodiment of a vehicle seat 10 in accordance with the present disclosure is shown, for example, in FIGS. 1 and 2. The illustrative vehicle seat 10 includes a head restraint 12, a seat back 14, and a seat bottom 16. In some embodiments, the head restraint 12, the seat back 14, and/or the seat bottom 16 may be movable or otherwise adjustable, for example adjustable for seat bottom angle, seat back recline, and/or head restraint position. The vehicle seat 10 is coupled, for example, to a vehicle such as a car or truck (not shown) to provide seating for the vehicle's driver and/or other occupants. The vehicle seat 10 may also be attached to the vehicle via one or more frame rails to allow selective positioning of the vehicle seat 10 relative to the vehicle. A second embodiment of a vehicle seat 400 in accordance with the present disclosure is shown in FIG. 6.

The vehicle seat 10 is shown in FIGS. 1 and 2. As described above, the vehicle seat 10 includes the head restraint 12, the seat back 14, and the seat bottom 16. The vehicle seat 10 further includes several pneumatic bladders 18. The pneumatic bladders 18 provide support and cushioning to a vehicle occupant and may be positioned throughout the vehicle seat 10. The bladders 18 may include, for example, massage bladders, side bolster bladders, lumbar bladders, and any other pneumatic bladder included in the vehicle seat 10. As shown in FIG. 1, the illustrative vehicle seat 10 includes four bladders 18a through 18d in the head restraint 12, ten bladders 18e through 18n in the seat back 14, and two bladders 18o and 18p in the seat bottom 16. The bladders 18 may be incorporated within the vehicle seat 10 along with other supportive materials, such as support cushions made of foam, springs, or other suitable material, structural components such as seat frames and seat pans, seat trim, fabric layers, and other seat components. In some embodiments, in addition to providing support and/or cushioning, the bladders 18 may provide additional comfort features such as massage. While vehicle seat 10 is shown with sixteen separate bladders 18a-18p, a vehicle seat in accordance with the present disclosure may have any suitable number of bladders arranged in any suitable arrangement.

Each of the bladders 18 is coupled with a pressure sensor 20. Thus, as shown in FIG. 1, the illustrative vehicle seat 10 includes 16 pressure sensors 20a through 20p coupled to the bladders 18a through 18p, respectively. Each pressure sensor 20 may be embodied as any electronic sensor capable of measuring the air pressure within a bladder 18, such as a piezoresistive pressure sensor, bend sensor, or other electronic pressure sensor. Although illustrated as including a single pressure sensor 20 for each bladder 18, some embodiments of a vehicle seat in accordance with the present disclosure may include a different number and/or arrangement of pressure sensors 20.

The vehicle seat 10 further includes an inflation source 22 configured to inflate the bladders 18 to a selected pressure. For example, the inflation source 22 may be embodied as one or more electric air pumps, electrically operable valves, or other pressurized air source. In some embodiments, the inflation source 22 may also include solid state motor control electronics used to control the pressurized air source. In some embodiments, the inflation source 22 may be configured to control the inflation pressure of each bladder 18 individually.

The vehicle seat 10 further includes a seat adjuster 24 configured to adjust the angle, position, or other settings of the vehicle seat 10 and/or the parts of the vehicle seat 10 (e.g., the head restraint 12, the seat back 14, and/or the seat bottom 16). The seat adjuster 24 may be embodied as or otherwise include one or more electric motors or other electric actuators, solid state motor control electronics, as well as any associated gearing, guide rails, and other components used to adjust the vehicle seat 10.

The vehicle seat 10 further includes a seat controller 26, which may be embodied as an electronic control unit or other controller configured to control the functions of the vehicle seat 10. In particular, and as described further below, the seat controller 26 is configured to read pressure data generated by the pressure sensors 20 and identify a user (i.e., a driver, passenger, or other occupant) of the vehicle seat 10 based on that pressure data. The seat controller 26 is further configured to adjust the vehicle seat 10 (for example, by controlling the seat adjuster 24 and/or the inflation source 22) based on one or more user preferences associated with the user. By automatically identifying the user and applying customized user preferences, the vehicle seat 10 may improve the user experience provided by the vehicle seat 10 and thus may increase occupant comfort. By using pressure sensors 20 coupled to the bladders 18, the seat controller 26 may identify the user using a relatively low-resolution pressure map. Additionally, the seat controller 26 may provide improved functionality using hardware already included in the vehicle seat 10 for other functions, such as pneumatic bladders 18 and/or pressure sensors 20 used for massage features and/or for adjustable lumbar support or side bolsters.

The inflation source 22, the seat adjuster 24, and/or the seat controller 26 may be positioned underneath or within the seat bottom 16 as best shown in FIG. 1. In some embodiments, the seat controller 26 may include or be otherwise coupled with a side shield positioned on the outside of the vehicle seat 10. The side shield may include one or more buttons, switches, or other user controls that allow the user to interact with and otherwise control the vehicle seat 10.

The seat controller 26 may be embodied as any device capable of performing the functions described herein. For example, the seat controller 26 may be embodied as an electronic control unit, embedded controller, control circuit, microcontroller, computing device, on-board computer, and/or any other any other computing device capable of performing the functions described herein. As shown in FIG. 2, the illustrative seat controller 26 includes a processor 28, an I/O subsystem 30, a memory 32, a data storage device 34, and communication circuitry 36. The seat controller 26 may include other or additional components, such as those commonly found in an electronic control unit (e.g., various input/output devices), in other embodiments. Additionally, in some embodiments, one or more of the illustrative components may be incorporated in, or otherwise form a portion of, another component. For example, the memory 32, or portions thereof, may be incorporated in the processor 28 in some embodiments.

The processor 28 may be embodied as any type of processor capable of performing the functions described herein. For example, the processor 28 may be embodied as a microcontroller, digital signal processor, single or multi-core processor(s), or other processor or processing/controlling circuit. The memory 32 may be embodied as any type of volatile or non-volatile memory or data storage capable of performing the functions described herein. In operation, the memory 32 may store various data and software used during operation of the processor 28 such as operating systems, applications, programs, libraries, and drivers. The memory 32 is coupled to the processor 28 via the I/O subsystem 30, which may be embodied as circuitry and/or components to facilitate input/output operations with the processor 28, the memory 32, and other components of the seat controller 26. For example, the I/O subsystem 30 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 30 may form a portion of a system-on-a-chip (SoC) and be incorporated, along with the processor 28, the memory 32, and other components of the seat controller 26, on a single integrated circuit chip.

The data storage device 34 may be embodied as any type of device or devices configured for short-term or long-term storage of data such as, for example, memory devices and circuits, memory cards, hard disk drives, solid-state drives, read-only memory, or other data storage devices. The communication circuitry 36 of the seat controller 26 may be embodied as any communication circuit, device, or collection thereof, capable of enabling communications between the seat controller 26 and other devices of the vehicle seat 10 and/or the vehicle. The communication circuitry 36 may be configured to use any one or more communication technology (e.g., wireless or wired communications) and associated protocols (e.g., Ethernet, controller area network (CAN), local interconnect network (LIN), Bluetooth®, Wi-Fi®, etc.) to effect such communication. In some embodiments, the communication circuitry 36 may include one or more general-purpose I/O pins, analog interfaces, solid state motor control electronics, and/or other circuitry that may be used to interface with or otherwise control the inflation source 22 and/or the seat adjuster 24.

As shown in FIG. 2, the seat controller 26 is configured, for example, to transmit and/or receive data over a vehicle network 38 with one or more additional vehicle controllers 40. The vehicle network 38 may be embodied as any bus, network, or other communication facility used to communicate between devices in the vehicle. For example, the vehicle network 38 may be embodied as a wired or wireless local area network (LAN), controller area network (CAN), and/or local interconnect network (LIN). The vehicle controllers 40 may include one or more additional electronic control units, embedded controllers, engine computers, or other computing devices used to control various vehicle functions. In particular, the seat controller 26 may be configured to communicate with one or more additional vehicle controllers 40 via the vehicle network 38 to determine the state of the vehicle, for example to determine whether the vehicle is unlocked, to determine whether the ignition is on, or to determine other vehicle state.

Figure 3:
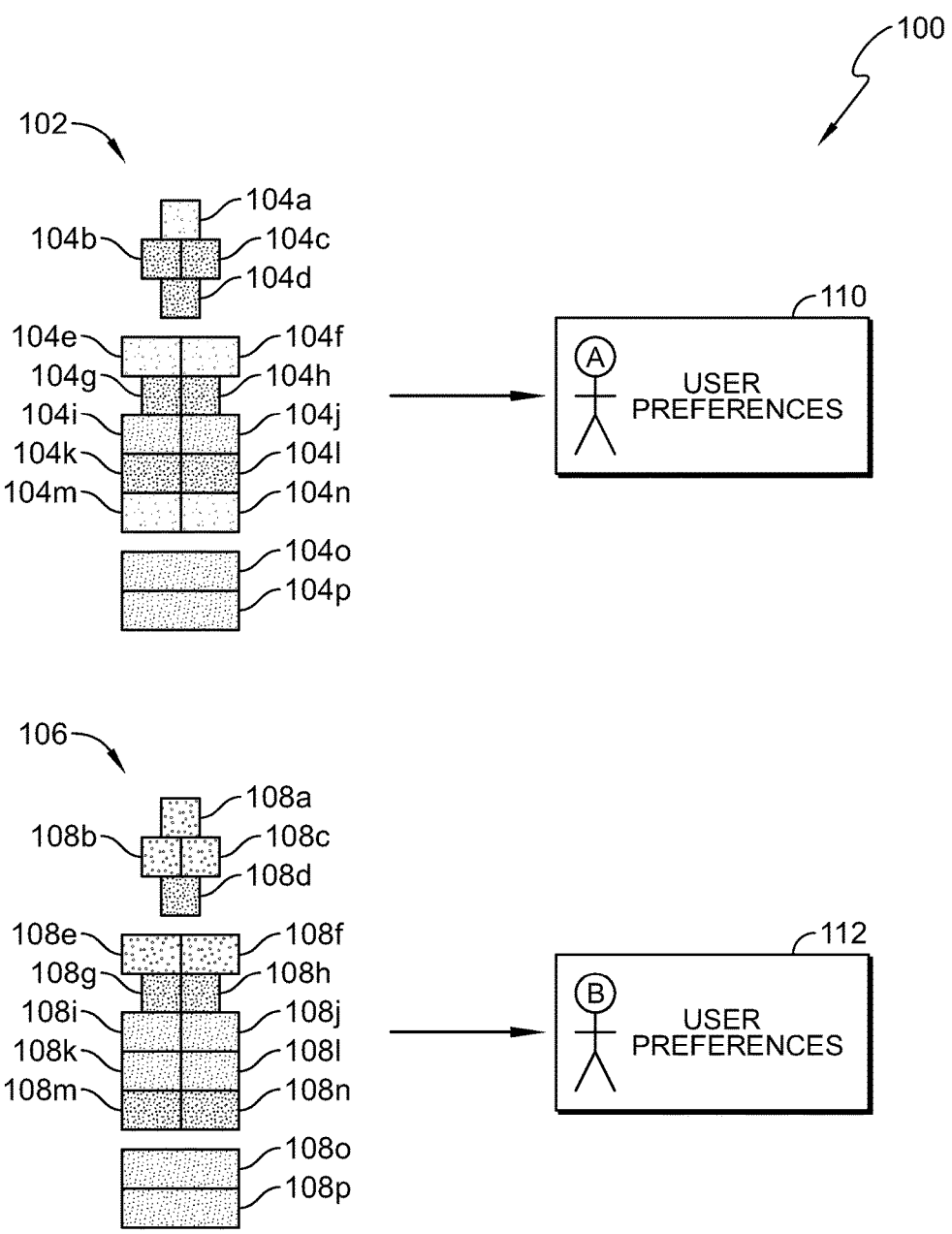
FIG. 3 is a schematic diagram illustrating pressure maps that may be generated by the vehicle seat of FIGS. 1 and 2 and showing identification of various users based on the pressure maps.

Referring now to FIG. 3, a schematic diagram 100 illustrates pressure maps that may be generated by the vehicle seat 10 of FIGS. 1 and 2. The diagram 100 shows a graphical representation of a pressure map 102 including several pressure map elements 104. Each pressure map element 104 corresponds to a pressure value measured by a pressure sensor 20 of the vehicle seat 10. For example, the illustrative pressure map 102 includes 16 pressure map elements 104a through 104p corresponding to the pressure sensors 20a through 20p, respectively. Each pressure map element 104 is associated with a pressure value. The pressure value of each pressure map element 104 is represented in the diagram 100 by its corresponding shading. The diagram 100 further includes another pressure map 106 having pressure map elements 108a through 108p. As shown, the pressure maps 102, 106 each include differing pressure values of the pressure map elements 104, 108.

As shown in FIG. 3, a set of user preferences 110 for a user A is associated with the pressure map 102, and another set of user preferences 112 for a user B is associated with the pressure map 106. The user preferences 110, 112 may each include vehicle seat adjustment settings, comfort settings, and other individualized settings associated with the corresponding user. As described further below, the seat controller 26 identifies the occupant of the vehicle seat 10 based on the measured pressure map and then selects the associated user preferences 110, 112. For example, in the illustrative example, the seat controller 26 may generate the pressure map 102 based on data received from the pressure sensors 20, identify the user A, and then select the associated user preferences 110. As another example, the seat controller 26 may generate the pressure map 106 based on data received from the pressure sensors 20, identify the user B, and then select the associated user preferences 112. After selecting the matching user preferences 110, 112, the seat controller 26 applies the selected user preferences 110, 112, for example by adjusting the inflation settings, the position settings, and/or the comfort features of the vehicle seat 10.

Referring now to FIG. 4, in the illustrative embodiment, the seat controller 26 establishes an environment 200 during operation. The illustrative environment 200 includes an entry/exit detection module 202, an inflation control module 204, a pressure measurement module 206, a user preferences module 210, a seat adjustment module 214, and a user behavior module 216. The various modules of the environment 200 may be embodied as hardware, firmware, software, or a combination thereof. For example the various modules, logic, and other components of the environment 200 may form a portion of, or otherwise be established by, the processor 28 or other hardware components of the seat controller 26. As such, in some embodiments, any one or more of the modules of the environment 200 may be embodied as a circuit or collection of electrical devices (e.g., entry/exit detection circuitry, inflation control circuitry, etc.).

The entry/exit detection module 202 is configured to detect user entry into a vehicle containing the vehicle seat 10. The entry/exit detection module 202 is further configured to detect user exit from the vehicle. The entry/exit detection module 202 may use any technique to detect the user entry or exit, such as determining whether the vehicle's doors are unlocked.

The inflation control module 204 is configured to inflate the pneumatic bladders 18 of the vehicle seat 10 to a measurement pressure in response to detection of user entry. The measurement pressure may be a minimum pressure that allows the pressure sensors 20 to make relevant measurements of the pressure in the bladders 18. The inflation control module 204 may be configured inflate the pneumatic bladders 18 by sending appropriate commands to the inflation source 22.

The pressure measurement module 206 is configured to measure a pressure value in each of bladders 18 using the pressure sensors 20 after inflating the bladders 18 to the measurement pressure. The pressure measurement module 206 is further configured to generate a pressure map using the measured pressure values. The pressure map includes pressure map elements, and each pressure map element corresponds to a pressure value generated by a corresponding pressure sensor 20. The pressure measurement module 206 is further configured to identify a current user of the vehicle seat 10 (e.g., a driver, a passenger, or other occupant of the vehicle seated in the vehicle seat 10) based on the pressure map. The pressure measurement module 206 may be configured to store or otherwise maintain pressure map data 208. The pressure map data 208 may include pressure maps and information associating those pressure maps with users of the vehicle seat 10. The pressure map data 208 may be embodied in any appropriate format, including as a binary array, bitmap, vector, database, or other data object. In some embodiments, the pressure map data 208 may be stored in the memory 32 and/or in the data storage device 34 of the seat controller 26.

A pressure map in accordance with the present disclosure may be a relatively low-resolution pressure map. The relatively low-resolution pressure map comprises, for example, less than 100 pressure map elements. In another example, he relatively low-resolution pressure map comprises less than 80 pressure map elements. In another example, he relatively low-resolution pressure map comprises less than 60 pressure map elements. In another example, he relatively low-resolution pressure map comprises less than 50 pressure map elements. In another example, he relatively low-resolution pressure map comprises less than 40 pressure map elements. In another example, he relatively low-resolution pressure map comprises less than 30 pressure map elements. In another example, he relatively low-resolution pressure map comprises less than 25 pressure map elements. In another example, he relatively low-resolution pressure map comprises less than 24 pressure map elements. In another example, he relatively low-resolution pressure map comprises less than 22 pressure map elements. In another example, he relatively low-resolution pressure map comprises less than 20 pressure map elements. In another example, he relatively low-resolution pressure map comprises less than 18 pressure map elements. In another example, he relatively low-resolution pressure map comprises less than 16 pressure map elements. In another example, he relatively low-resolution pressure map comprises less than 14 pressure map elements. In another example, he relatively low-resolution pressure map comprises less than 12 pressure map elements. In another example, he relatively low-resolution pressure map comprises less than 10 pressure map elements. In another example, he relatively low-resolution pressure map comprises less than 8 pressure map elements.

The user preferences module 210 is configured to determine one or more vehicle seat settings associated with the current user in response to identification of the current user. The vehicle seat settings may include any vehicle seat settings, comfort settings, or other individualized or customized options selected by the user of the vehicle seat 10. For example, a vehicle seat setting may be embodied as an inflation setting, a position setting, or a comfort feature setting. The user preferences module 210 may be configured to store or otherwise maintain user preferences data 212, which may include the vehicle seat settings associated with the users of the vehicle seat 10. In some embodiments, the user preferences data 212 may be stored in the memory 32 and/or in the data storage device 34 of the seat controller 26.

The user behavior module 216 is configured to identify user behavior based on the current pressure map generated using the pressure sensors 20. The user behavior may include the user shifting weight or pressure in the vehicle seat 10 or other movements made by the user in the vehicle seat 10. As described below, the user behavior may be indicative of user discomfort, or in some embodiments may indicate a requested vehicle command. In some embodiments, the user behavior module 216 may be configured to continually measure pressure in the seat bladders 18 to detect user behavior while the vehicle seat 10 is occupied.

The seat adjustment module 214 is configured to adjust the vehicle seat 10 based on the vehicle seat settings associated with the identified user, and/or to adjust the vehicle seat 10 based on the detected user behavior. For example, the seat adjustment module 214 may adjust the inflation settings of the bladders 18, adjust the position of the vehicle seat 10 and/or the position of parts of the vehicle seat 10, activate comfort features of the vehicle seat 10, or otherwise adjust the vehicle seat 10. In some embodiments, the seat adjustment module 214 may be configured to activate a vehicle command based on the detected user behavior. For example, the seat adjustment module 214 may activate a particular feature of the vehicle seat 10 in response to detection of a predefined movement of the user.

Referring now to FIG. 5, in use, the seat controller 26 may execute a method 300 for user identification and seat adjustment. The method 300 begins in block 302, in which the seat controller 26 detects user entry to the vehicle. The seat controller 26 may use any appropriate technique to detect user entry. For example, the seat controller 26 may detect that the user unlocks one or more doors of the vehicle, opens one or more doors of the vehicle, starts the vehicle ignition, or otherwise begins to use the vehicle. As described above, to detect user entry the seat controller 26 may communicate with one or more additional vehicle controllers 40 via the vehicle network 38. In block 304, the seat controller 26 determines whether user entry has been detected. If not, the method 300 loops back to block 302 to continue detecting user entry. If user entry has been detected, the method 300 advances to block 306.

In block 306, the seat controller 26 inflates the seat bladders 18 to a measurement pressure. The measurement pressure may be reached by inflating the bladders 18 with a minimum amount of air that allows the pressure sensors 20 to make relevant measurements of the pressure in the bladders 18. The measurement pressure for each seat bladder 18 may vary depending on the location of the bladder 18 in the vehicle seat 10 and/or the composition of the vehicle seat 10 (e.g., depending on the pressure exerted by other materials in the vehicle seat 10 on the bladder 18). The seat controller 26 may inflate the seat bladders 18 by sending and/or receiving appropriate control signals with the inflation source 22 and/or the pressure sensors 20.

In block 308, the seat controller 26 measures the pressure in the bladders 18 to generate a pressure map. As described above, the pressure map may include several pressure map elements, and each pressure map element corresponds to a pressure value measured by a pressure sensor 20. The seat controller 26 may generate the pressure map by sending and/or receiving appropriate control signals with the pressure sensors 20. The seat controller 26 may maintain the pressure map using any appropriate format, in-memory representation, storage format, or other digital representation. For example, the pressure map may be represented by an in-memory array, bitmap, vector, or any other suitable data.

In block 310, the seat controller 26 identifies the current user of the vehicle seat 10 based on the current pressure map. The seat controller 26 may, for example, compare the measured pressure map with contents of the pressure map data 208 that have been previously stored by the seat controller 26. The seat controller 26 may identify the current user by identifying pressure map data 208 that matches the current pressure map. In some embodiments, in block 312, the seat controller 26 may create an association between the current pressure map and the current user. For example, when a new user occupies the vehicle seat 10, the seat controller 26 may store pressure map data 208 that associates the current pressure map with the new user. In some embodiments, the seat controller 26 may also associate the current pressure map and/or the current user with user preferences stored in the user preferences data 212.

In block 314, the seat controller 26 retrieves user preferences associated with the current user. For example, the seat controller 26 may look up and retrieve user preferences from the user preferences data 212 that are associated with the current user. In some embodiments, the seat controller 26 may retrieve user preferences that are associated with the current pressure map, which is in turn associated with the current user as described above.

In block 316, the seat controller 26 adjusts the vehicle seat 10 based on the user preferences associated with the current user of the vehicle seat 10. As described above, the user preferences may include any vehicle seat settings or other customization options selected by the user. In some embodiments, in block 318, the seat controller 26 may adjust the position and/or inflation settings of the vehicle seat 10 based on the user preferences. The seat controller 26 may, for example, adjust the inflation pressure of some or all of the bladders 18 based on the user preferences. As another example, the seat controller 26 may adjust the position, angle, or other physical arrangement of the vehicle seat 10 and/or the parts of the vehicle seat 10 (e.g., the head restraint 12, the seat back 14, and/or the seat bottom 16) based on the user preferences. To control the position and inflation settings of the vehicle seat 10, the seat controller 26 may transmit and/or receive appropriate control messages with the inflation source 22 and the seat adjuster 24.

In some embodiments, in block 320, the seat controller 26 may adjust one or more comfort features of the vehicle seat 10 based on the user preferences. The seat controller 26 may adjust, for example, climate control features of the vehicle seat 10 such as heating or cooling, a massage feature, or other comfort features. In some embodiments, the seat controller 26 may perform more complex adjustments of the comfort features based on the user preferences. For example, the user preferences may indicate that the user has poor circulation. In that example, based on the user preferences, the seat controller 26 may activate a massage feature or otherwise adjust the comfort features of the vehicle seat 10 after detecting that the user has occupied the vehicle seat 10 for predefined time period (e.g., two hours).

In block 322, after adjusting the vehicle seat 10 based on the user preferences, the seat controller 26 continues to measure the pressure in the seat bladders 18 using the pressure sensors 20. As described above in connection with block 308, the seat controller 26 generates a pressure map based on the pressure values determined using the pressure sensors 20. In block 324, the seat controller 26 identifies user behavior based on the current pressure map. The seat controller 26 may identify changes in the pressure values represented by the pressure map. For example, the seat controller 26 may identify the user shifting his or her weight in the vehicle seat 10, the user fidgeting in the vehicle seat 10, or other movement of the user in the vehicle seat 10.

In block 326, the seat controller 26 may adjust the vehicle seat 10 based on the detected user behavior. The seat controller 26 may adjust the inflation pressure and/or position of the vehicle seat 10 based on the values of the current pressure map. Of course, no adjustments to the vehicle seat 10 may be necessary, for example when the pressure map remains relatively unchanged. In some embodiments, in block 328, the seat controller 26 may activate one or more comfort features based on detected discomfort. For example, the seat controller 26 may activate the massage function or a lumbar support function if the user is determined to be in discomfort based on the values of the pressure map.

In some embodiments, in block 330 the seat controller 26 may activate a vehicle command based on the detected user behavior. The vehicle command may include any control operation related to the vehicle and may not be limited to control of the vehicle seat 10. For example, in additional to commands relating to control of the vehicle seat 10, the vehicle command may include climate control commands, locking commands, driving assistance commands, in-vehicle infotainment system commands, navigation system commands, or other vehicle commands. The seat controller 26 may communicate with other vehicle controllers 40 to activate the vehicle command. In some embodiments, the user may purposefully move his or her body in the vehicle seat 10 to activate certain vehicle commands, allowing the user to control and otherwise communicate with the vehicle using body language. For example, the user may perform a predefined movement in the vehicle seat 10 to activate a particular vehicle command In block 332, the seat controller 26 detects whether the user has exited the vehicle. The seat controller 26 may use any appropriate technique to detect user exit. For example, the seat controller 26 may detect that the user stops the vehicle ignition, unlocks one or more doors of the vehicle, opens one or more doors of the vehicle, exits the vehicle seat 10, or otherwise exits the vehicle. As described above, to detect the user exit, the seat controller 26 may communicate with one or more additional vehicle controllers 40 via the vehicle network 38. If the user exit has not been detected, the method 300 loops back to block 322 to continue monitoring the pressure in the seat bladders 18 while the user occupies the vehicle. Referring back to block 332, if the user exit is detected, the method 300 loops back to block 302 to monitor for user entry.

A second embodiment of a vehicle seat 400 in accordance with the present disclosure is shown, for example, in FIG. 6. The illustrative vehicle seat 400 includes a head restraint 12, a seat back 14, a seat bottom 16, an inflation source 22, a seat adjuster 24, and a seat controller 26, which are all similar to the corresponding components of the vehicle seat 10 of FIGS. 1 and 2. However, as shown in FIG. 6, the vehicle seat 400 includes pneumatic bladders 18 and associated pressure sensors 20 only in the seat bottom 16 and the lumbar portion of the seat back 14. In particular, the illustrative vehicle seat 400 includes 12 bladders 18a through 18l and 12 corresponding pressure sensors 20a through 20l. Thus, the vehicle seat 400 may generate a pressure map having a different number and/or arrangement of pressure map elements compared to the vehicle seat 10. In particular, the pressure map generated by the vehicle seat 400 may have a lower resolution than the pressure map generated by the vehicle seat 10. Additionally, the pressure map generated by the vehicle seat 400 may cover less of the seating surface of the vehicle seat 400 as compared to the pressure map generated by the vehicle seat 10. Even though the pressure map may have lower resolution and/or coverage, the vehicle seat 400 may use the measured pressure map to identify a user and associated user preferences, similar to the vehicle seat 10.

The invention claimed is:

1. A vehicle seat for vehicle seat user recognition, the vehicle seat comprising
    a plurality of pneumatic bladders,
    a plurality of pressure sensors, wherein each of the pressure sensors is coupled to a corresponding pneumatic bladder, and
    a seat controller coupled to the plurality of pneumatic bladders and the plurality of pressure sensors,
    wherein the seat controller comprises an entry/exit detection module configured to detect user entry into a vehicle, an inflation control module configured to inflate the plurality of pneumatic bladders to a measurement pressure in response to detection of the user entry, and a pressure measurement module configured to measure, in response to inflation of the plurality of pneumatic bladders to the measurement pressure, a pressure value in each of the plurality of pneumatic bladders using the plurality of pressure sensors to generate a pressure map comprising a plurality of pressure map elements and each pressure map element includes the pressure value generated by a corresponding pressure sensor and identify a current user based on the pressure map.

2. The vehicle seat of claim 1, wherein the seat controller further comprises a user preferences module configured to determine a vehicle seat setting associated with the current user in response to identification of the current user and a seat adjustment module configured to adjust the vehicle seat based on the vehicle seat setting.

3. The vehicle seat of claim 2, wherein the vehicle seat setting comprises an inflation setting, a position setting, or a comfort feature setting.

4. The vehicle seat of claim 3, wherein the plurality of pressure map elements is less than about 20 pressure map elements.

5. The vehicle seat of claim 1, wherein the seat controller further comprises a user behavior module configured to identify a user behavior based on the pressure map and a seat adjustment module configured to adjust the vehicle seat based on the user behavior.

6. The vehicle seat of claim 5, wherein the plurality of pressure map elements is less than about 20 pressure map elements.

7. The vehicle seat of claim 1, wherein the plurality of pressure map elements is less than about 20 pressure map elements.

8. The vehicle seat of claim 7, wherein the plurality of pressure map elements is less than about 15 pressure map elements.

9. The vehicle seat of claim 8, wherein the plurality of pressure map elements is less than about 12 pressure map elements.

10. A seat controller for vehicle seat user recognition, the seat controller comprising
    an entry/exit detection module configured to detect user entry into a vehicle,
    an inflation control module configured to inflate a plurality of pneumatic bladders of a vehicle seat to a measurement pressure in response to detection of the user entry, and
    a pressure measurement module configured to measure, in response to inflation of the plurality of pneumatic bladders to the measurement pressure, a pressure value in each of the plurality of pneumatic bladders using a plurality of pressure sensors to generate a pressure map, each of the pressure sensors is coupled to a corresponding pneumatic bladder and the pressure map comprises a plurality of pressure map elements, each pressure map element including the pressure value generated by a corresponding pressure sensor and identify a current user based on the pressure map.

11. The seat controller of claim 10, further comprising
    a user preferences module configured to determine a vehicle seat setting associated with the current user in response to identification of the current user and a seat adjustment module configured to adjust the vehicle seat based on the vehicle seat setting.

12. The seat controller of claim 11, wherein the vehicle seat setting comprises an inflation setting, a position setting, or a comfort feature setting.

13. The seat controller of claim 12, wherein the plurality of pressure map elements is less than about 20 pressure map elements.

14. The seat controller of claim 10, further comprising
    a user behavior module configured to identify a user behavior based on the pressure map and a seat adjustment module configured to adjust the vehicle seat based on the user behavior.

15. A method for vehicle seat user recognition, the method comprising the steps of
    detecting, by a seat controller, user entry into a vehicle,
    inflating, by the seat controller, a plurality of pneumatic bladders of a vehicle seat to a measurement pressure in response to detecting the user entry,
    measuring, by the seat controller in response to inflating the plurality of pneumatic bladders to the measurement pressure, a pressure value in each of the plurality of pneumatic bladders using a plurality of pressure sensors to generate a pressure map, wherein each of the pressure sensors is coupled to a corresponding pneumatic bladder and wherein the pressure map comprises a plurality of pressure map elements, each pressure map element including the pressure value generated by a corresponding pressure sensor, and
    identifying, by the seat controller, a current user based on the pressure map.

16. The method of claim 15, further comprising the steps of
    determining, by the seat controller, a vehicle seat setting associated with the current user in response to identifying the current user and adjusting, by the seat controller, the vehicle seat based on the vehicle seat setting.

17. The method of claim 16, wherein the adjusting step comprises at least one of the steps of adjusting an inflation setting of the vehicle seat, adjusting a position setting of the vehicle seat, and activating a comfort feature of the vehicle seat.

18. The method of claim 17, wherein the plurality of pressure map elements is less than about 20 pressure map elements.

19. The method of claim 15, further comprising the steps of identifying, by the seat controller, a user behavior based on the pressure map and adjusting, by the seat controller, the vehicle seat based on the user behavior.

20. The method of claim 19, wherein the plurality of pressure map elements is less than about 20 pressure map elements.

* * * * *